(12) United States Patent
Califano et al.

(10) Patent No.: US 12,713,216 B2
(45) Date of Patent: Aug. 18, 2026

(54) AUTOMATIC PROXIMITY-BASED DEVICE-TO-DEVICE USER INTERFACE PORTING

(71) Applicant: ZEBRA TECHNOLOGIES CORPORATION, Lincolnshire, IL (US)

(72) Inventors: Brian Califano, Point Pleasant, NJ (US); Mark Thomas Fountain, Hitchin (GB); Noel Steven Massey, Carpentersville, IL (US); James S. L. Chen, Brampton (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 864 days.

(21) Appl. No.: 17/900,669

(22) Filed: Aug. 31, 2022

(65) Prior Publication Data

US 2024/0073663 A1 Feb. 29, 2024

(51) Int. Cl.
*H04W 4/80* (2018.01)
*H04W 4/02* (2018.01)
*H04W 76/10* (2018.01)
*H04W 84/18* (2009.01)

(52) U.S. Cl.
CPC ............. *H04W 4/80* (2018.02); *H04W 4/023* (2013.01); *H04W 76/10* (2018.02); *H04W 84/18* (2013.01)

(58) Field of Classification Search
CPC ....... H04W 4/80; H04W 76/10; H04W 4/023; H04W 84/18; H04W 84/20
See application file for complete search history.

(56) References Cited

U.S. PATENT DOCUMENTS

| | | | | |
|---|---|---|---|---|
| 9,311,041 | B2 * | 4/2016 | Rydenhag | H04L 67/04 |
| 2016/0196099 | A1 | 7/2016 | Rydenhag et al. | |
| 2016/0373884 | A1 * | 12/2016 | Peterson | G06F 3/165 |
| 2019/0014582 | A1 * | 1/2019 | Yogev | H04W 16/14 |
| 2019/0364492 | A1 | 11/2019 | Azizi et al. | |
| 2022/0086246 | A1 * | 3/2022 | Chen | H04L 67/54 |
| 2022/0108788 | A1 | 4/2022 | Shelton, IV et al. | |
| 2023/0410172 | A1 * | 12/2023 | Goetz | G06F 16/93 |

OTHER PUBLICATIONS (WO 2017084325 A1), Wang, Information Sharing Method, Terminal, and Storage Medium, May 2017, pp. 1-14 ( Year: 2017).*
International Search Report and Written Opinion for International Application No. PCT/US2023/28192 mailed on Oct. 24, 2023.

* cited by examiner

*Primary Examiner* — Keith Ferguson

(57) ABSTRACT

Systems and methods for proximity device to device user interface management are disclosed. The systems and methods include a primary user device displaying variable data to a user assigned one or more tasks to be performed. In response to determining that the primary user device is within a predetermined range of an assistive device, the systems and methods pair the two devices, identify task data and/or other data, and modify a user interface displayed on the assistive device, where the modification occurs from device to device communication of displayed variable data and results in variable data from the primary user device being displayed on the assistive device.

21 Claims, 10 Drawing Sheets

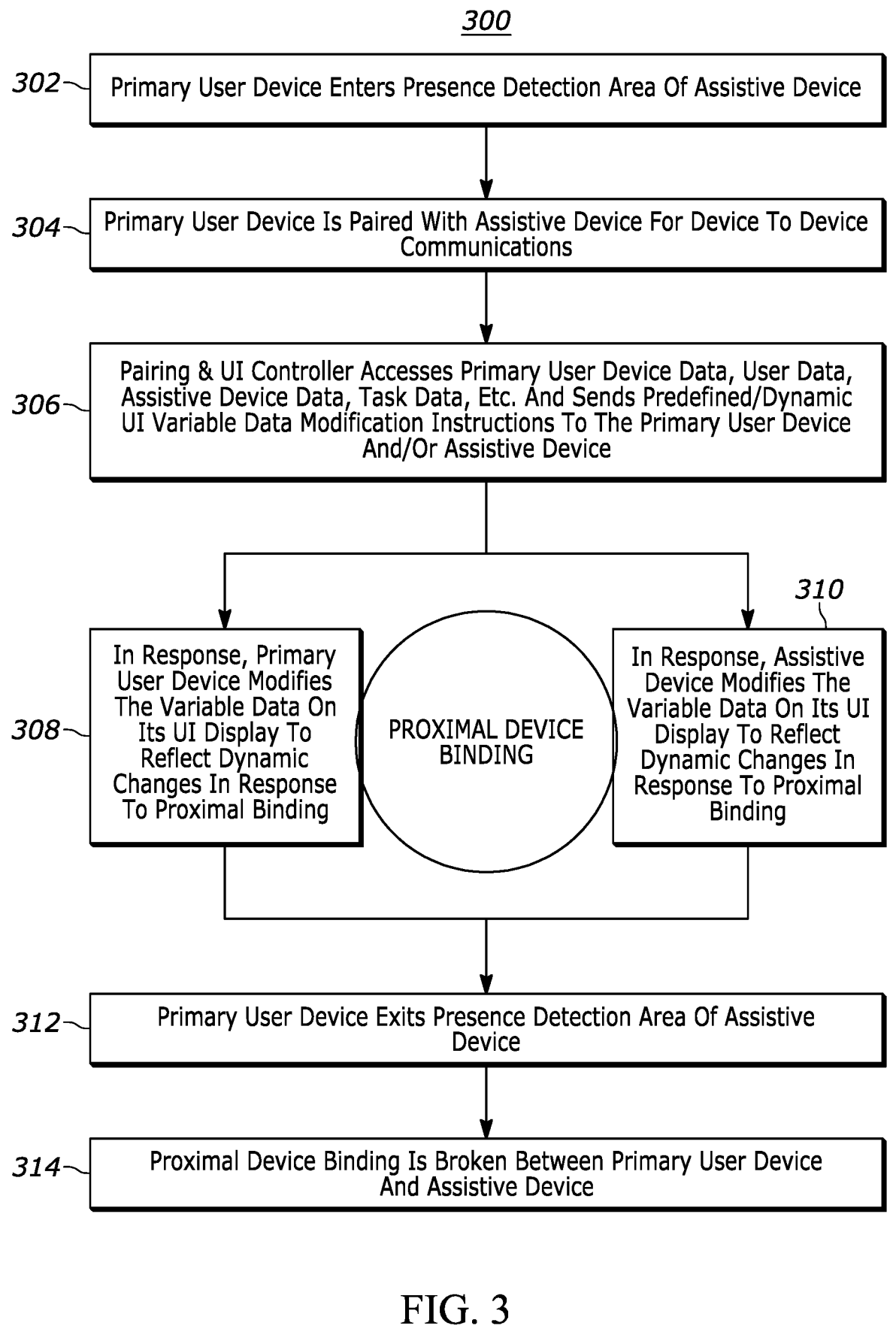

300

302 Primary User Device Enters Presence Detection Area Of Assistive Device

304 Primary User Device Is Paired With Assistive Device For Device To Device Communications 306 Pairing & UI Controller Accesses Primary User Device Data, User Data, Assistive Device Data, Task Data, Etc. And Sends Predefined/Dynamic UI Variable Data Modification Instructions To The Primary User Device And/Or Assistive Device 308 In Response, Primary User Device Modifies The Variable Data On Its UI Display To Reflect Dynamic Changes In Response To Proximal Binding

PROXIMAL DEVICE BINDING

310 In Response, Assistive Device Modifies The Variable Data On Its UI Display To Reflect Dynamic Changes In Response To Proximal Binding 312 Primary User Device Exits Presence Detection Area Of Assistive Device 314 Proximal Device Binding Is Broken Between Primary User Device And Assistive Device

FIG. 3

AUTOMATIC PROXIMITY-BASED DEVICE-TO-DEVICE USER INTERFACE PORTING

BACKGROUND

Warehousing facilities, distribution facilities, and the like are vital to ensuring that customers, whether individuals or businesses, receive goods in a timely and reliable manner. To meet the demands from customers and suppliers alike, workers in these facilities are often assigned demanding tasks. Workers who handle products, boxes, etc., for example, often use mobile devices or wearables for guiding their workflows and for information. For example, to complete tasks, workers may need to look at their device interface many times throughout each task to ensure proper task completion. This repetitive use can lead to potential optical strain and physical strain in the neck and shoulder area over time. Indeed, in some instances, a task may need completion in such a manner that accessing the device is impractical altogether, even though the device may display important information regarding that task.

There is a need to provide workers and other users, in these facilities, with visibility to the information they require in an ergonomically comfortable and convenient accessible manner. Further, for warehouse and distribution facilities with automation capabilities, there is a need for systems and methods for provide proximity-based device to device interactions to provide such information in a more user assistive manner.

SUMMARY

In an embodiment, the present invention is a system for proximity device to device user interface management, the system comprising: a first device having at least one processor, a transceiver, and a display, the first device being configured to display first variable data on the display to a user of the first device, where the first variable data are modifiable in response to task data for one or more tasks performed by the user of the first device; a second device having at least one processor, a transceiver, and a display, the second device being configured to display second variable data on the display to the user of the first device; a controller; and a memory storing computer-readable instructions that, when executed by the controller, cause the controller to, pair the first device with the second device when the first device and the second device are within a predetermined range of each other, identify a state of task data of the first device, and instruct the second device to modify, in response to the identified state of the task data, the second variable data displayed on the second device display for viewing by the user of the first device.

In a variation of this embodiment, the controller is further configured to instruct the second device to modify the second variable data displayed on the second device display in response to a change in a distance between the first device and the second device, when the first device and the second device are within the predetermined range of each other.

In a variation of this embodiment, the controller is further configured to instruct the second device to modify the second variable data displayed on the second device display by at least one of increasing or decreasing a size of the second variable data displayed on the second device display in response to the change in the distance between the first device and the second device, and changing the second variable data displayed on the second device display in response to the change in the distance between the first device and the second device.

In a variation of this embodiment, the controller is further configured to instruct the second device to modify the second variable data displayed on the second device display to include the first variable data displayed on the first device display.

In a variation of this embodiment, the second variable data comprises at least one of task instructions for the user of the first device obtained from the first device, proximity information, duplicate information from the first variable data, task completion information, a request for user input to the second device display, and alternative task instructions.

In a variation of this embodiment, the controller is further configured to instruct the first device to modify the first variable data displayed on the first device display in response to state data of the second device.

In a variation of this embodiment, the state data of the second device comprises at least one of task completion state data and task exception state data.

In a variation of this embodiment, the controller is further configured to instruct the second device to modify, in response to the second device state data, the first variable data displayed on the first device display to display at least one of task instructions for the user of the first device, proximity information, duplicate information from the second variable data, task completion information, a request for user input to the first device display, and alternative task instructions.

In a variation of this embodiment, the system further comprises a proximity detection subsystem configured to detect when the first device and the second device are within the predetermined range of each other.

In a variation of this embodiment, the proximity detection subsystem comprises at least one of the transceiver of the first device and the transceiver of the second device and is configured to receive position data from the first device and/or the second device and determine when the first device and the second device are within the predetermined range of each other.

In a variation of this embodiment, the transceiver of the first device and the transceiver of the second device are each a Bluetooth Low Energy (BLE) radio transceiver or a Bluetooth radio transceiver.

In a variation of this embodiment, the proximity detection subsystem is a ranging system configured to determine a change in distance between the first device and the second device when the first device and the second device are within the predetermined range of each other.

In a variation of this embodiment, the proximity detection subsystem is a locationing system communicatively coupled to the first device and the second device.

In a variation of this embodiment, the controller is further configured to unpair the first device and the second device in response to at least one of an indication from the proximity detection subsystem that the first device and the second device are outside of the predetermined range of each other, and receiving task completion information from the first device or the second device.

In a variation of this embodiment, the first device is a mobile device, a wearable device, or a heads up display device, and the second device is one of an autonomous mobile robot (AMR), a mobile robot, and a drone.

In another embodiment, the present invention is a method for proximity device to device user interface management, the method comprising: determining when a first device and a second device are in a predetermined range of each other, the first device being configured to display first variable data to a user of the first device, where the first variable data are modifiable in response to task data for one or more tasks performed by the user of the first device and the second device being configured to display second variable data; pairing the first device with the second device when the first device and the second device are within the predetermined range of each other; identifying a state of task data of the first device; and instructing the second device to modify, in response to the identified state of the task data, the second variable data displayed on the second device display for viewing by the user of the first device.

In a variation of this embodiment, the method further comprises instructing the second device to modify the second variable data displayed on the second device display in response to a change in a distance between the first device and the second device, when the first device and the second device are within the predetermined range of each other.

In a variation of this embodiment, instructing the second device to modify the second variable data displayed on the second device display comprises at least one of: increasing or decreasing a size of the second variable data displayed on the second device display in response to the change in the distance between the first device and the second device, and changing the second variable data displayed on the second device display in response to the change in the distance between the first device and the second device In a variation of this embodiment, the method further comprising instructing the second device to modify the second variable data displayed on the second device display to include the first variable data displayed on the first device display.

In a variation of this embodiment, the second variable data comprises at least one of task instructions for the user of the first device obtained from the first device, proximity information, duplicate information from the first variable data, task completion information, a request for user input to the second device display, and alternative task instructions.

In a variation of this embodiment, the method further comprising instructing the first device to modify the first variable data displayed on the first device display in response to state data of the second device.

In a variation of this embodiment, the state data of the second device comprises at least one of task completion state data and task exception state data In a variation of this embodiment, the method further comprises further comprising detecting when the first device and the second device are within the predetermined range of each other using a proximity detection subsystem.

In a variation of this embodiment, the proximity detection subsystem comprises at least one of the transceiver of the first device and the transceiver of the second device and is configured to receive position data from the first device and/or the second device and determine when the first device and the second device are within the predetermined range of each other.

In a variation of this embodiment, the transceiver of the first device and the transceiver of the second device are each a Bluetooth Low Energy (BLE) radio transceiver or a Bluetooth radio transceiver.

In a variation of this embodiment, the method further comprises unpairing the first device and the second device in response to at least one of an indication from the proximity detection subsystem that the first device and the second device are outside of the predetermined range of each other, and receiving task completion information from the first device or the second device.

In a variation of this embodiment, the first device is a mobile device, a wearable device, or a heads up display device, and the second device is one of an autonomous mobile robot (AMR), a mobile robot, and a drone.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a flowchart representative of an example method for proximity device to device user interface management, in accordance with embodiments described herein.

Figure 1:
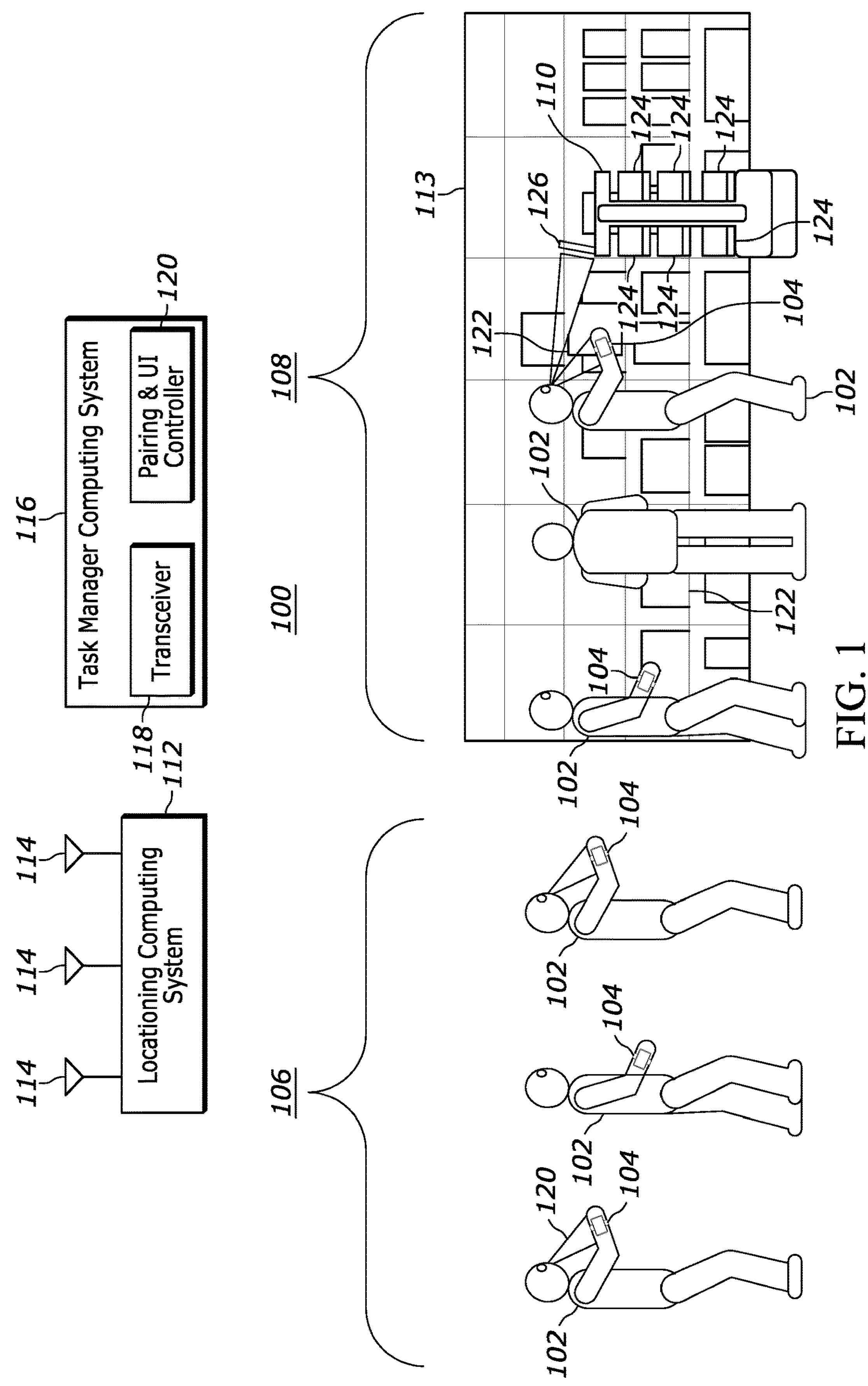
FIG. 1 depicts an example environment in which systems/devices perform proximity device to device user interface (UI) management, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, workers who handle products/boxes and who use mobile devices or wearables for guiding their workflows and for information often need to look at their device interface many times throughout each task and generally throughout their workday. This can lead to potential optical strain and physical strain in the neck and shoulder area over time. For example, workers will often need to orient and look at their device interface many times (e.g., by turning heads, lifting and rotating wrists and forearms) throughout each task. Instructions may be provided on these devices, as well as data indicating the status/completion progress of an assigned task. Yet, when holding boxes/products, their hands/arms will be occupied and positioned in a non-optimal way for user interface visibility (e.g., the device is rotated out of view or obstructed by the product/box). This problem can force workers to take physically-straining or time-wasting steps like rotating their forearm/wrist while holding a heavy product or putting the product back down to view the device's user interface.

Therefore, it is an objective of the present disclosure to provide systems and methods capable of providing proximity device-to-device user interface (UI) management. In various examples, proximity device-to-device UI management reduces the strain to a worker (or other user) by using other, more optimally positioned device interfaces (termed "assistive devices") to display redundant or other relevant information to the worker when the worker and their primary device are in close proximity to that assistive device. Then relevant information can be displayed in potentially more than one viewing location or position, giving the worker visibility to the information where it is most optimal for the worker to view it. The relevant information may be variable data, such as instructions for the user of the first device obtained from the first device, proximity information, duplicate information from the first variable data, task completion information, a request for user input to the second device display, and alternative task instructions, among other data. As a result, workers can safely hold items while viewing relevant information in an ergonomically optimized position, mitigating physical/optical strain over the course of a shift. Further workers may increase efficiency and productivity due to the reduced number of actions they need to take, glancing/viewing their device for example, to complete a task.

Thus, in some examples, it is an objective of the present disclosure to provide systems and methods capable of providing proximity device to device UI management. Example, systems may include a first device (e.g., a primary user device) having at least one processor, a transceiver, and a display. The first device may be configured to display first variable data on the display to a user, where the first variable data are modifiable in response to task data for one or more tasks performed by the user of the first device. The system may include a second device (e.g., an assistive device) having at least one processor, a transceiver, and a display. The second device may be configured to display second variable data on the display to the user of the first device. The system may further include a controller and a memory storing computer-readable instructions. These instructions include instructions to pair the first device with the second device when the first device and the second device are within a predetermined range of each other, identify a state of task data of the first device, and instruct the second device to modify, in response to the identified state of the task data, the second variable data displayed on the second device display for viewing by the user of the first device.

FIG. 1 depicts an example environment 100 in which systems/devices for proximity device to device user interface (UI) management may be implemented, in accordance with embodiments described herein. The example environment 100 may generally be a store, warehouse facility, distribution facility, or the like setting through which a user (e.g., a worker or other user) 102 is able to move for completing various assigned tasks. Tasks may include collecting, carrying, placing, or otherwise moving packages or boxes within the environment 100, in response to instructions received at a user device 104, serving as a primary user device for the user 102. Other tasks may include directions to move to a particular location in the environment 100, such as a particular location in a warehouse facility, and await further instructions or interact with another user or with a secondary device.

In the example of FIG. 1, the user 102 is depicted in different locations as the user moves throughout the environment 100. More specifically, the environment 100 is shown with a pre-presence detection area 106 and a presence detection area 108. As discussed further herein, the pre-presence detection area 106 represents an area over which the user device 104 cannot be paired with a second device 110, which in the illustrated example is an assistive device. By contrast, a presence detection area 108 represents an area over which, when the user device 104 is within that area, the user device 104 and the second device 110 may be paired for proximity-based device-to-device UI management. References herein to a user device being within a presence detection area with another device for pairing (e.g., for UI management) include the physical user device being within the presence detection area and/or a detection region of and surrounding that user device overlapping with a presence detection area. More specifically, the presence detection area 108 may be a static area within an environment 100 or, as discussed in various examples herein, a dynamic area that is determined based on the proximity between the user device 104 and the second device 110. The presence detection area 108 coincides with the shelving 113 by way of example, but can change based on the movement of at least one of the user device 104 and the second device 110. For example, when the second device 110 is a movable device, such as an autonomous mobile robot (AMR), a mobile robot, or a drone capable of moving within the environment 100, the presence detection area 108 may change.

The presence detection area 108 may be determined by a proximity detection subsystem configured to detect when the first device 104 and the second device 110 are within the predetermined range of each other. The proximity detection subsystem may be a transceiver in either of the user device 104 and the second device 110. Examples include a BLUETOOTH® Low Energy (BLE) radio transceiver or a BLUETOOTH® radio transceiver. In some examples, the proximity detection subsystem is a ranging system configured to determine a change in distance between the user device 104 and the second device 110 when the user device 104 and the second device 110 are within the predetermined range of each other. Exampling ranging systems include sonar, laser, WiFi-positioning, or wireless (BLUETOOTH® or radio-frequency identification (RFID) locationing systems. In yet other examples, the proximity detection subsystem can be a locationing system communicatively coupled to the user device 104 and the second device 110. An example, optional locationing system 112 is depicted in FIG. 1 and may include an antenna array 114 for triangulating the position of the user device 104 and the second device 110. While one locationing system 112 is shown it will be appreciated that a plurality of locationing devices may be distributed throughout a facility, communicatively coupled together or to a central node or other computing system, for determining the location and proximity to one another of the user device 104 and the second device 110. While examples of determining proximity between the user device 104 and second device 110 are described, in some examples the presence detection area 108 is determined based on another determined location. For example, the presence detection area 108 may be an area within a proximity of a package or other object 122 that one or both of the user device 104 and the second device 110 must be within for pairing between the two. In yet other examples, the presence detection area 108 includes not only proximity based data as described, but conditional data, such as task information. For example, the presence detection area 108 may be an area over which pairing of the user device 104 and second device 110 occurs only if a pre-condition is met, such as the existence of a task assigned to either or both devices 104, 110 by a task manager computing system 116 through a communication link between the devices 104, 110 and a transceiver 118.

In the illustrated example, as the user 102 moves from a first position to the left to a final position on the right, the user 102 is initially able to view the user device 104, without strain, as the device 104 (and more specifically the device display) is within a user field of view 120. That continues until the user 102 reaches a position for performing a task action, e.g., the $5^{th}$ position shown where the user 102 has turned to pick up a package 122. To complete the task, the user 102 is to pick up the package 122 and place it on one of the assigned bins 124 of the second device 110, from which the second device 110 may automatically move the package 122 to a desired destination in the environment 100 or to another environment (not shown). While the user 102 is not able to view the display of the device 104 when carrying the package 122, due to the device to device UI management techniques described herein, the user 102 is presented with the relevant task information as UI variable data provided on a display 126 of the second device 110. In some examples, the displays of the user device 104 and the second device 110 are controlled to display variable data through a pairing and UI controller, example of which is shown as controller 120 in the task manager computing system 116.

Figure 2A:
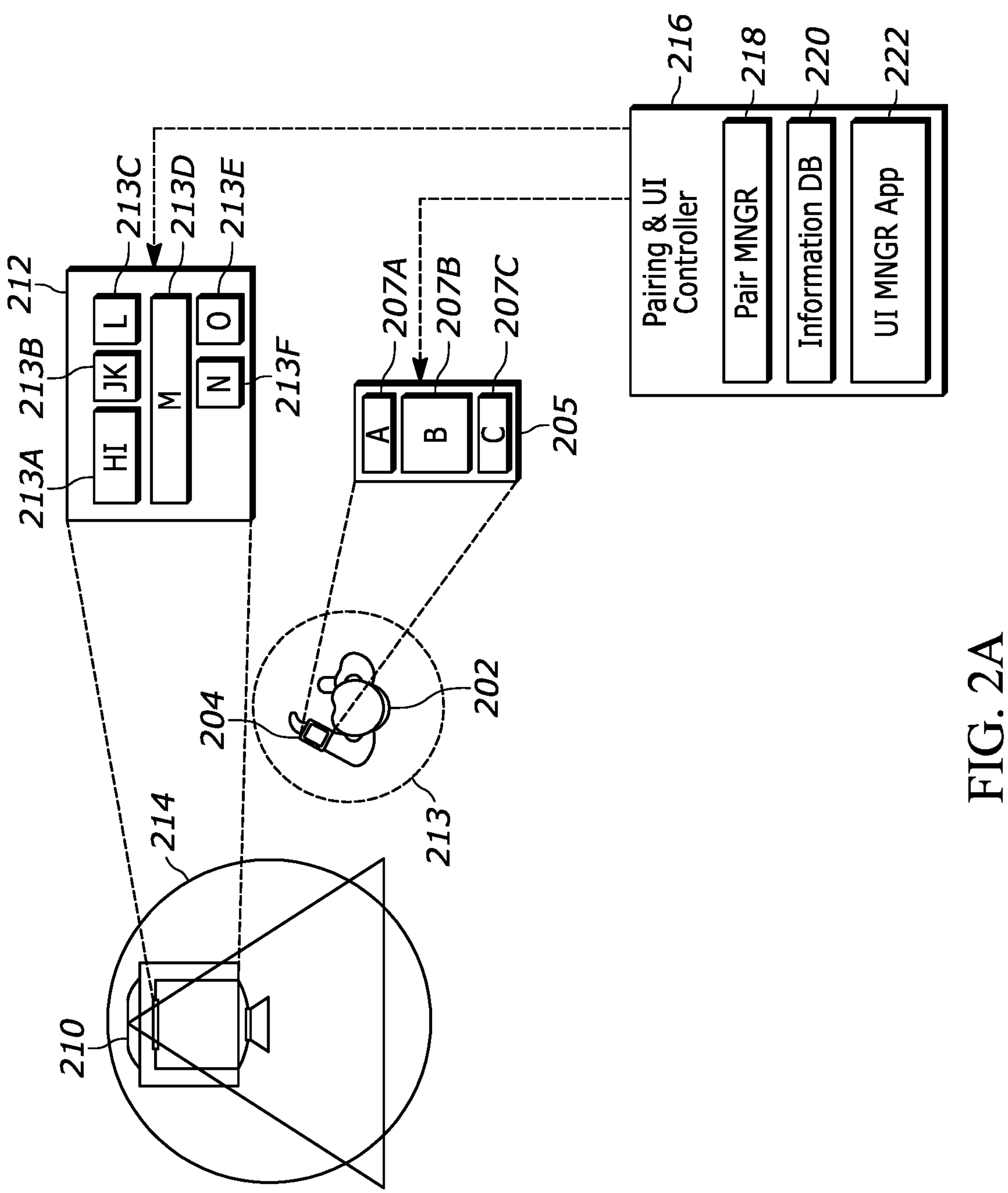
FIGS. 2A and 2B depict example implementations of a user device and secondary device before pairing (FIG. 2A) and after pairing and a resulting device to device UI management (FIG. 2B), in accordance with embodiments described herein.
Figure 2B:
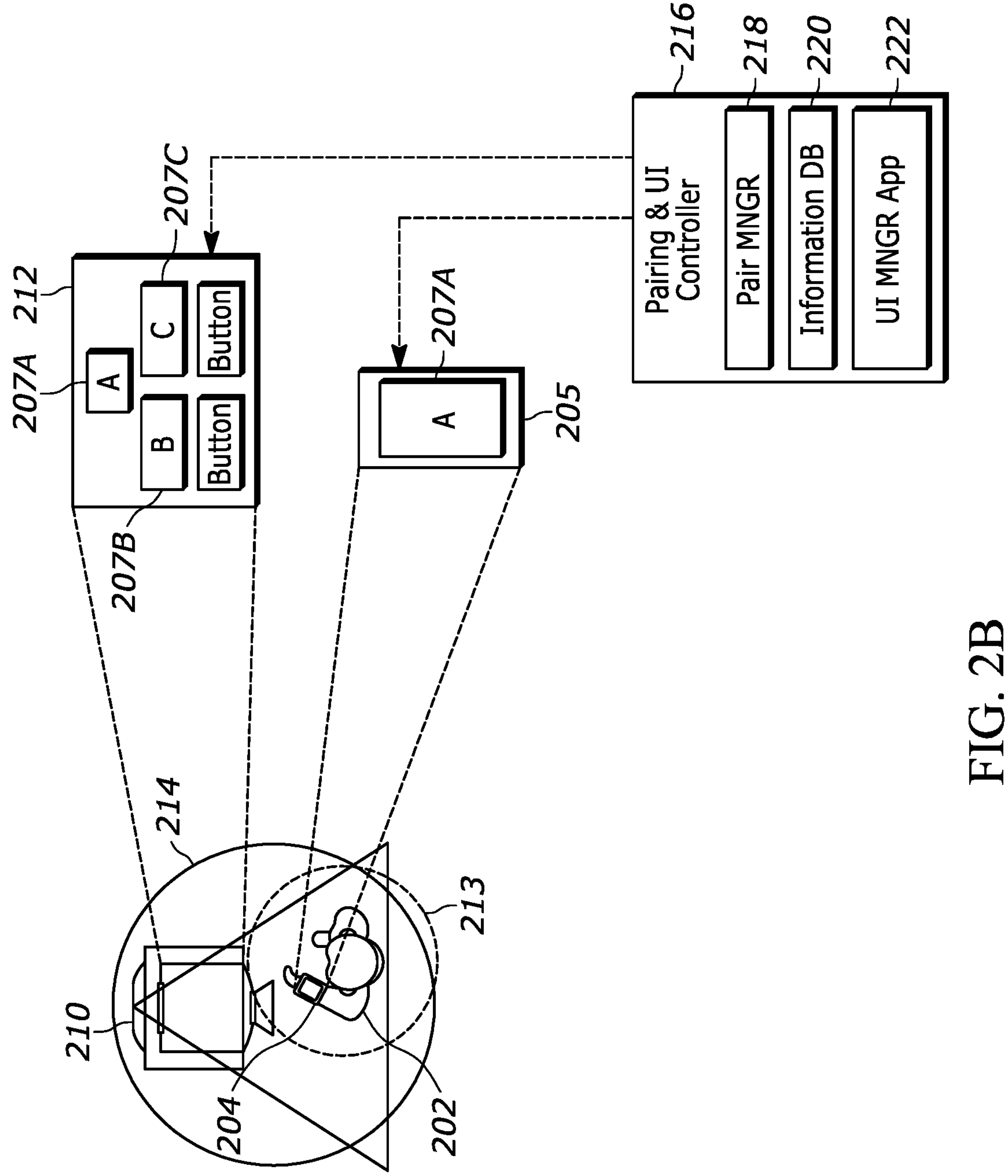

FIGS. 2A and 2B illustrate schematics of an example implementation of the device pairing and device to device UI management as may be performed by the controller 120 or other processors herein. In FIG. 2A, a user 202 wears a wearable user device 204 having a display 205 that displays variable data in the form of three different data elements 207A, 207B, and 207C, which correspond to a current state of a task, therefore a current state of task data. That is, the data elements 207A-207C may vary what is displayed on the display 205 based on the progress of the user 202 in completing an assigned task. Or, any of these data elements may be removed entirely or replaced with other data elements, examples of which are described further herein. The user device 204 serves as a primary device, while a second device 210 is also shown and has a display 212 that displays variable data of its own. That variable data may be entirely independent from that of the variable data displayed on the user device 204, as shown in the example of FIG. 2A, where the two devices 204 and 210 are not paired. Example variable data elements are 213A-213F. In the example of FIG. 2A, a pairing & UI controller 216 is communicatively coupled to one or both of the devices 204 and 210 and determines whether the two devices are in a presence detection area 214. In the illustrated example, the presence detection area 214 is defined corresponding to that of the second device 210, although this not need be the case. Further, although the pairing & UI controller 216 is illustrated separately, in some examples, the controller may be implemented in one or both of the devices 204, 210. In the illustrated example, the controller 216 includes a pairing manager 218, an information database 220 (such as a task information database), and an UI management application (APP) 222 for administering data transfers to/from each device 204/210, for modifying variable data on display at each device, and other processes described herein.

FIG. 2B illustrates an example proximity device to device UI management achieved by the pairing & UI controller 216 when the user device 104 enters the presence detection area 214. More specifically, FIG. 2B illustrates an example implementation of the controller 216 executing a process 300 shown in FIG. 3. Referring to FIG. 3, at a block 302 (and as shown in FIG. 2B), the user 202 enters the presence detection area 214 with the user device 204, where the presence detection area 214 is a proximal area around the second device 210. It is noted, that in some examples, the user device 204 is in the presence detection area 214 to affect pairing, while in other examples, a detection region 213 of the user device 204 (for example, defined by an RF transceiver therein) overlaps with the presence detection area 214 to affect pairing. The device 204 is treated as a primary device in the process 300, and the device 210 is treated as an assistive device, in the method 300. The pairing manager 218 determines a presence of the device 204 within the area 214, for example, from data received from a proximity detection subsystem (not shown). In response to the detection, the devices 204 and 210 are paired for device to device communication, at block 304. At a block 306, the process 300 may access various types of data, including user device data, second device data, user data, state of task data, or other data. This data may be collected from the devices 204, 210, from a task management system, or other source. This data may be previously stored data, such as stored in the information database 220. Further, the block 306 processes that data and determines modifications to be made to either or both of the variable data on display at the user device 204 and the second device 210.

Returning to FIG. 2B, the block 306 may be implemented to send instructions to the second device 210 to modify (at block 310) the variable data on display in various ways. In the illustrated example, the block 306 (e.g., via the pairing & UI controller 216 analyzing user device data, second device data, user data, state of task data, or other obtained data) determines to replicate the data elements 207A, 207B, and 207C from the user device 204 onto the display 212 of the second device 210. As a result, the variable data on the display 212, no longer includes data elements 213A-213F, but instead the UI on the second device 210 includes a replication of the data elements 207A-207C. It is noted that the replication may present the data elements contents but in a different location, different size, and/or different format, as may be determined by the second device 210. In any case, the display 212 is shown in FIG. 2B in an example implementation. Any one or more of the data elements 207A-207C may be obtained as user device UI data and replicated on the display 212. Further, the display may retain any one or more of the data elements 213A-213F and display those along with the one of more data elements 207A-207C to generate the modified UI. In these ways, the second device 210 functions as an assistive device allowing the user 202 to view the display 212, instead of the display 205, thereby allowing the user to avoid unnecessary viewing strain.

As further shown in FIG. 3, in some examples, the block 306 may optionally send instructions to modify the display 205 of the user device 204. For example, at a block 308, the user device 204 may modify the variable data to display modifications to the currently displayed data elements, different data elements stored or otherwise determined at the user device 204, or display data elements obtained from the second device 210. In some examples, including that shown in FIG. 2B, the block 308 may modify the display to display viewer data elements, with only data element 207A shown, and shown in a larger size that originally displayed in FIG. 2A.

The processes of blocks 306, 308, and 310 may be performed fully or partially by the UI manager APP 222. Further while the UI manager APP 222 is illustrated as separate from the devices 204, 210, in some examples, the UI manager APP may be distributed to include subcomponents on each of the devices 204, 210 for performing processes described herein. Indeed, in various examples, the processes and methods described and illustrated herein may be performed entirely at or between two devices, e.g., a primary device and an assistive device, without communication of data to an external controller. The pairing & UI controller herein may be within one or both of the devices, for example. Also, in some examples, the block 306 may be performed at a controller, whether extern or within one of the devices, that instructs the primary and assistive devices to communicate data elements (or other data) directly with one another to affect device to device UI management.

Further, the blocks 306, 308, and 310 may be repeated as the user 202 progresses toward task completion. That is, the block 306 may receive updates to state of task data and determine if modifications to one or both of the displays 205 and 212 should result from the updates. The blocks 306, 308, and 310 therefore may continue to perform device to device UI management, until the (primary) user device exits the presence detection area of the assistive device (at a block 312), where, in response, the process 300 breaks the proximal binding between the two devices 204, 210 (at a block 314), after which device to device UI management is no longer available.

Figure 4:
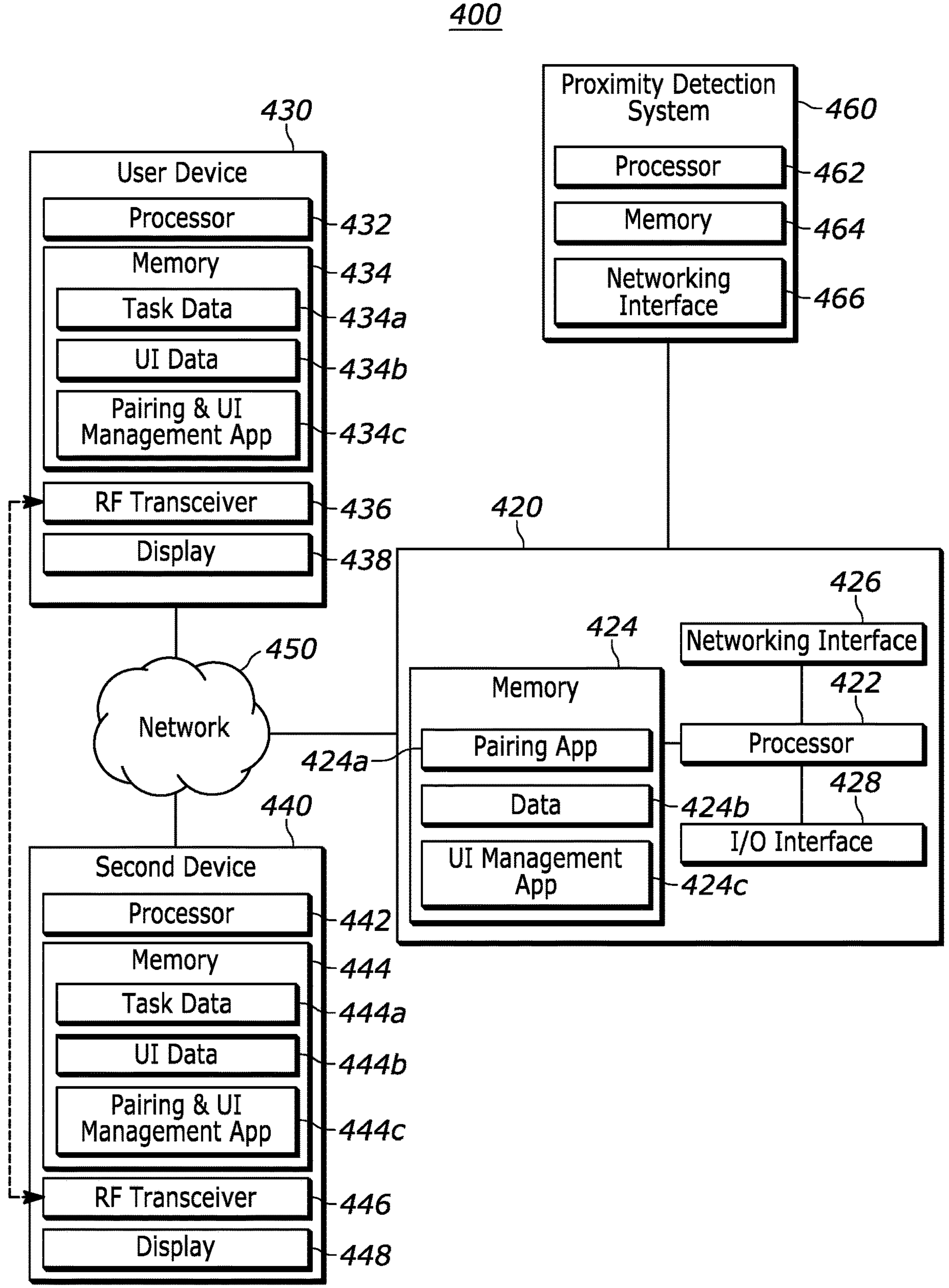
FIG. 4 is a block diagram of an example logic circuit for implementing example systems/devices and methods and/or operations described herein including those of FIGS. 1-3, in accordance with embodiments described herein.

FIG. 4 is a block diagram representative of an example logic circuit capable of implementing example methods and/or operations described herein. As an example, the example logic circuit may be capable of implementing one or more components of FIGS. 1, 2A, and 2B. FIG. 4 illustrates an example system 400 for proximity device to device UI management. More specifically, example logic circuit is shown of a processing platform 420 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs). In an example, the processing platform 420 is implemented at a task manager computing system (e.g., system 116), a pairing & UI controller (e.g., 120 or 216), or other computing systems/devices herein.

The example processing platform 420 includes a processor 422 such as, for example, one or more microprocessors, controllers, and/or any suitable type of processor. The example processing platform 420 includes memory (e.g., volatile memory, non-volatile memory) 424 accessible by the processor 422 (e.g., via a memory controller). The example processor 422 interacts with the memory 424 to obtain, for example, machine-readable instructions stored in the memory 424 corresponding to, for example, the operations represented by the flowcharts of this disclosure. The memory 424 includes proximity pairing application 424*a*, data 424*b*, and an UI management application 424*c*, each of which are accessible by the example processor 422. While shown separately, in some examples, the pairing application 424*a* and the UI management application 424*c* may be executed in the same application. In an example operation, the processor 422 may access the memory 424 to execute the pairing application 424*a* to determine when a user device and a second device are in a presence detection area and to perform device pairing when that condition is satisfied. In a further example operation, the processor 422 may access the memory 424 to store or access data 424*b* (or other data that may be stored in the memory 424), for use by the UI management application 424*c*, which instructs one or both of the user device and the second device to modify variable data on display at either device in response to the proximal pairing. In some examples, the UI management application 424*c* provides such UI modification instructions in response to state of task data. In some examples, the UI management application 424*c* provides such UI modification instructions in response to changes in the distance between the user device and a second device, when the two devices are within the presence detection area.

The example processing platform 420 includes a networking interface 426 to enable communication with other machines and systems via, for example, one or more networks. The example networking interface 426 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example processing platform 420 also includes input/output (I/O) interfaces 428 to enable receipt of user input and communication of output data to the user. Such user input and communication may include, for example, any number of keyboards, mice, USB drives, optical drives, screens, touchscreens, etc.

The processing platform 420 is connected to a user device 430 that includes a processor 432, a memory 434, a radio frequency (RF) transceiver 436, and a display 438. The processing platform 420 is further connected to a second device 440 that includes a processor 442, a memory 444, a RF transceiver 446, and a display 448. The devices 430 and 440 may be communicatively coupled to the platform 420 through a network 450. Separately, the devices 430 and 440 may be communicatively coupled to one another for device to device communication through their RF transceivers 436 and 446.

The user device 430 and the second device 440 may each include flash memory used for determining, storing, or otherwise processing data corresponding to one or more task for completion by a user, corresponding to one or more objects associated with one or more tasks, corresponding to locations within a facility, and other data used for completing tasks. In the illustrated example, each memory 434, 444 stores task data 434*a*, 444*a*. Further each memory 434, 444 may store variable data in the form of data elements or other UI data (434*b*, 444*b*) that are used in a UI displayed on the respective displays 438, 448, including modifications received from the process platform 420 or from the other respective device. The memories 434, 444 may be used to store proximity information, duplicate information from the first variable data, task completion information, a request for user input to the second device display, and alternative task instructions.

The memories 434, 444 may further store pairing & UI management applications (APPs) 434*c* and 444*c*, respectively, where these APPs may combine with the APPs 424*a* and 424*c* to perform one or more steps of the processors and methods described herein.

The processing platform 420 is further connected to a proximity detection subsystem 460 configured to detect when the first device and the second device are within the predetermined range of each other, whether that connection may be direct through the networking interface 426 or through the network 450.

Each of the one or more memories 424, 434, 444, and 464 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., the pairing application 424*a*, the UI management application 424*c*, the pairing & UI management application 434*c*, the pairing & UI management application 444*c*, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 422, 432, 442, or 462 (e.g., working in connection with the respective operating system in the one or more memories 424, 434, 444, and 464) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 424, 434, 444, and 464 may store an operating system (OS) (e.g., Microsoft Windows, Linux, UNIX, etc.) capable of facilitating the functionalities, apps, methods, or other software as discussed herein. The one or more memories 424, 434, 444, and 464 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a task management application, UI management application, etc., configured to facilitate various functionalities discussed herein.

The one or more processors 422, 432, 442, and 462 may be connected to the one or more memories 424, 434, 444, and 464 via a computer bus responsible for transmitting electronic data, data packets, or otherwise electronic signals to and from the one or more processors 422, 432, 442, and 462 and one or more memories 424, 434, 444, and 464 to implement or perform the machine readable instructions, methods, processes, elements or limitations, as illustrated, depicted, or described for the various flowcharts, illustrations, diagrams, figures, and/or other disclosure herein.

The one or more processors 422, 432, 442, and 462 may interface with the one or more memories 424, 434, 444, and 464 via the computer bus to execute the operating system (OS). The one or more processors 422, 432, 442, and 462 may also interface with the one or more memories 424, 434, 444, and 464 via the computer bus to create, read, update, delete, or otherwise access or interact with the data stored in the one or more memories 424, 434, 444, and 464 and/or external databases (e.g., a relational database, such as Oracle, DB2, MySQL, or a NoSQL based database, such as MongoDB). The data stored in the one or more memories 424, 434, 444, and 464 and/or an external database may include all or part of any of the data or information described herein, including, for example, task data, data elements for display in UI and/or other suitable information.

The networking interface 426 and 466 and RF transceivers 436 and 446 may be configured to communicate (e.g., send and receive) data via one or more external/network port(s) to one or more networks or local terminals, such as network 450, described herein. In some embodiments, networking interface 426 and 466 and RF transceivers 436 and 446 may include a client-server platform technology such as ASP.NET, Java J2EE, Ruby on Rails, Node.js, a web service or online API, responsive for receiving and responding to electronic requests. The networking interface 426 and 466 and RF transceivers 436 and 446 may implement the client-server platform technology that may interact, via the computer bus, with the one or more memories 424, 434, 444, and 464 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interface 426 and 466 and RF transceivers 436 and 446 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 450 or through direct device to device communication in some embodiments. In some embodiments, network 450 may comprise a private network or local area network (LAN). Additionally, or alternatively, network 450 may comprise a public network such as the Internet. In some embodiments, the network 450 may comprise routers, wireless switches, or other such wireless connection points communicating to the processing platform 420 (via the networking interface 426), the user device 430 (via the RF transceiver 436), and the second device 440 (via the RF transceiver 446) via wireless communications based on any one or more of various wireless standards, including by non-limiting example, IEEE 802.11a/b/c/g (WIFI®), the BLUETOOTH® standard, or the like.

The RF transceivers 436 and 446 may generally be a device configured to receive data and to transfer data to other RF transceivers. For example, the RF transceivers 436 and 446 may be devices that execute and/or conform to any suitable software operating system (e.g., Android, iOS), a custom Internet of Things (IoT) bridge device with a BLE radio, and/or any other suitable device or combination thereof. The RF transceivers 436 and 446 may also each have a networking interface (not shown) which may enable the RF transceivers 436 and 446 to communicate with each other, with a separate beacon device (not shown), a gateway server (not shown) or other device using any suitable communication protocol (e.g., Wi-Fi, LTE, 3G, etc.).

The I/O interface 428 may include or implement operator interfaces configured to present information to an administrator or operator and/or receive inputs from the administrator or operator. The displays 438 and 448 may be connected to respective I/O interfaces (not shown) in devices 430 and 440. A user interface may be provided on each display screen (438 and 448) which a user/operator may use to visualize any images, graphics, text, data, features, pixels, and/or other suitable visualizations or information. For example, the device 430 and the device 440 may comprise, implement, have access to, render, or otherwise expose, at least in part, a graphical user interface (GUI) for displaying images, graphics, text, data, features, pixels, and/or other suitable visualizations or information on the display screen. The I/O interface 428 and/or the displays 438, 448 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the processing platform 420, the device 430, and/or the device 440. The displays 438, 448 may be implemented may be interactive touchscreen displays allowing user input. Further the displays 438, 448 may be accompanied by a keyboard or keypad connected through respective I/O interfaces (not shown) in the devices 430 and 440. Further still, in some examples the displays 438, 448 may be replaced with (or augmented to include) a voice-interaction device, a haptic device, or keypad button interface.

Figure 5:
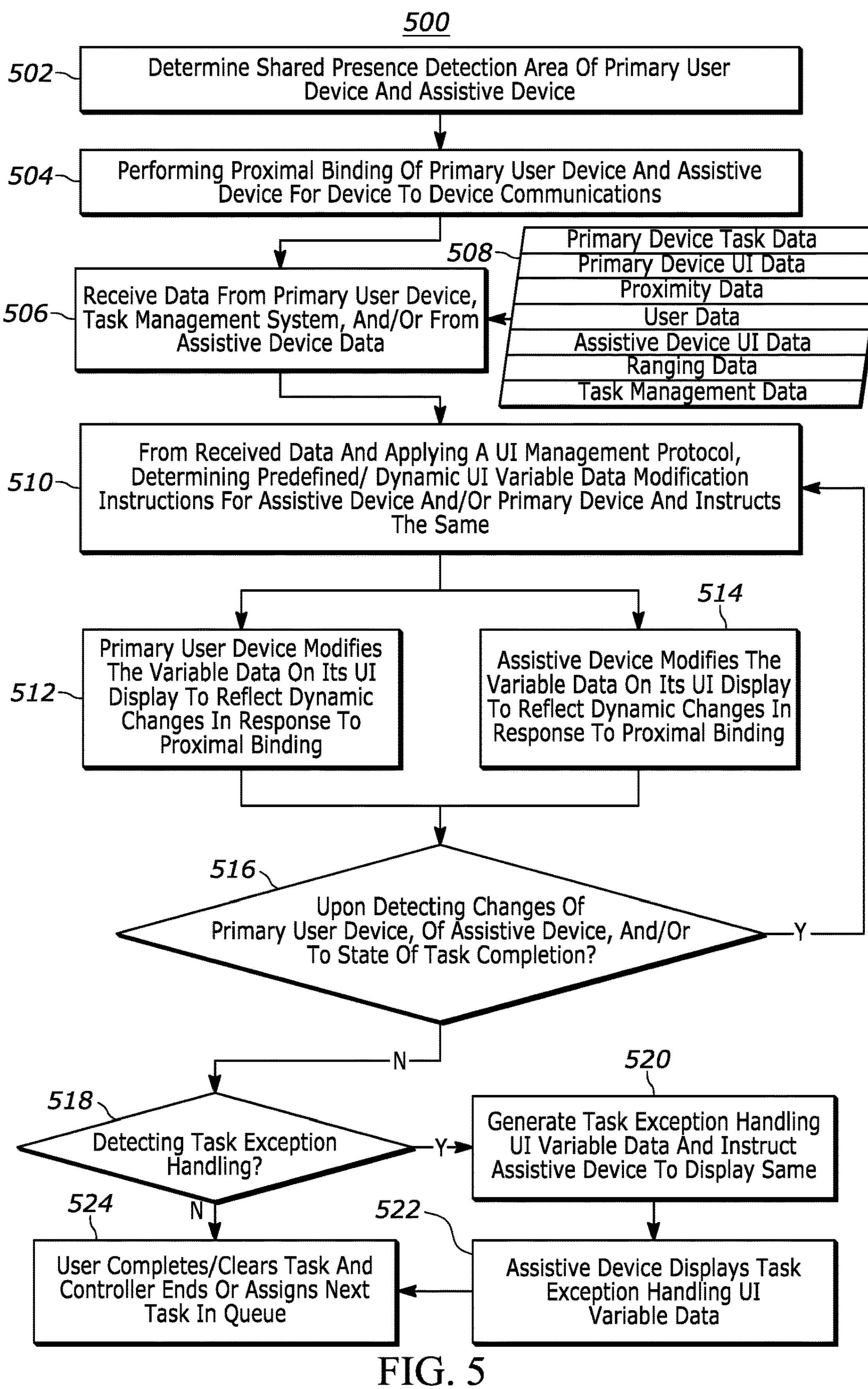
FIG. 5 is a flowchart representative of another example method for proximity device to device user interface management, in accordance with embodiments described herein.

Generally, the pairing application 424*a*, UI management app 424*c*, and pairing & UI management applications 434*c* and 444*c* may include and/or otherwise comprise executable instructions (e.g., via the one or more processors 422, 432, and 442) that allow devices in an environment to perform proximal device binding between two or more devices and perform device to device UI management in accordance with examples herein, including the processes described and illustrated in reference to FIGS. 1-3. FIG. 5 provides another example process 500 that may be implemented by the system 400.

Referring to FIG. 5, at a block 502, the method determines a shared presence detection area of a primary (user) device and a second (assistive) device. In the example of system 400, the processing platform 420 may receive location data from the proximity detection system 460 for each of the user device 430 and the second device 440 and determine (via pairing application 424*a*) when the two are in a presence detection area of one another. That is, in some examples, the processing platform 420 executes as an administrative platform that defines the proximity conditions required to establish that two devices are within a presence detection area of one another. In other examples, however, the determination of a shared presence detection area may be made at the proximity detection system 460. In yet other examples, the determination of shared presence detection area may be made at either the second device 440 or the user device 430, for example with one of RF transceiver 434*c*, 444*c* detecting the other. That is, in some examples, determination of a shared presence detection area is made by both the primary user device and the assistive device, where the determination is from detecting one another or from position data received from a proximity detection system in communication with the one or more devices.

Whichever device, system, or platform provides the administrative function, that function can include defining the variables that establish when devices are available for proximal pairing at a block 504. These defined variables may be stored in a database, e.g., in memory 424, as proximal condition data. In some examples, block 502 determines when devices are in a presence detection area based on (i) sensors (e.g., BLUETOOTH®, BLUETOOTH® Low Energy, or LIDAR sensors), (ii) known location data for a primary device, assistive device, last location of one or both, direction of movement data, speed of movement data, distances traveled data, etc., (iii) assumed locations of a primary device and/or assistive device based on process data, workflow, and task data (e.g. rack location of an object)), or (iv) the assistive device scanning for the primary device.

In some examples, the proximity detection system 460 may be a locationing system or a ranging system, where the later system is configured to not only determine presence detection area sharing, but further determine a distance between devices and changes to that distance. The proximity detection systems herein may be separate from the primary and assistive devices or formed wholly are partially within such devices. In some examples, individually or collectively, the RF transceivers 436 and 446 are configured to perform proximity detection and to determine when the RF transceivers 436 and 446 are within a presence detection area. For example the RF transceivers 436 and 446 may be BLUETOOTH® Low Energy (BLE) radio transceivers or BLUETOOTH® radio transceivers. At a block 504, a controller, such as the processing platform 420, performs proximal device binding, pairing the primary user device and the assistive device. Such pairing may send instructions to each device to authenticate the other device for device to device communication for UI management. Such pairing may transmit instructions to each device to transmit requested data to a central controller, such as the processing platform 420, for UI management.

At a block 506, the processing platform accesses various data for use in UI management between the primary and assistive devices, e.g., data from a primary user device, a task management system, and/or from an assistive device. Accessed data 508 may be from devices, such as “primary device task data” such as data stored on a primary device, data scanned by a user via a primary device, data input to a UI display on the primary device, etc. Accessed data 508 may include “primary device UI data” such as current variable data displayed on display of the primary device. Accessed data 508 may include “proximity data” indicating that a device detects or does not detect another device in a proximal range or “ranging data” indicating a distance between devices. Accessed data 508 may include “user data” such as user identification data. Accessed data 508 may include “assistive device UI data” such as current variable data displayed on display of the assistive device. Accessed data 508 may include "task management data" such as data on future tasks to be assigned to a user or task data with instructions for the assistive device upon a user's completion of a task.

At a block 510, the processing platform 420 receives the data and applying a UI management protocol, determines either predefined or dynamic UI variable data modification instructions for one or both of the primary user device and the assistive device, which instructions are transmitted to the respective devices. Example UI management protocols may include instructions to display data elements from one device (such as the primary device) on the display of the other device (such as the assistive device). The UI management protocols can include a series of conditions that are used to determine how to affect the assistive device display (and in some examples the primary device display) in response to proximal binding between devices. In some examples, the UI management protocols are task dependent, with different protocols for different tasks, or task state dependent, with protocols that depend on the state of completion of a task. In some examples, the UI management protocols may include ranked conditions prioritizing which UI changes take precedence over others. The UI management protocols may be stored in a processing platform memory, such as the data 424*b*.

Figure 6:
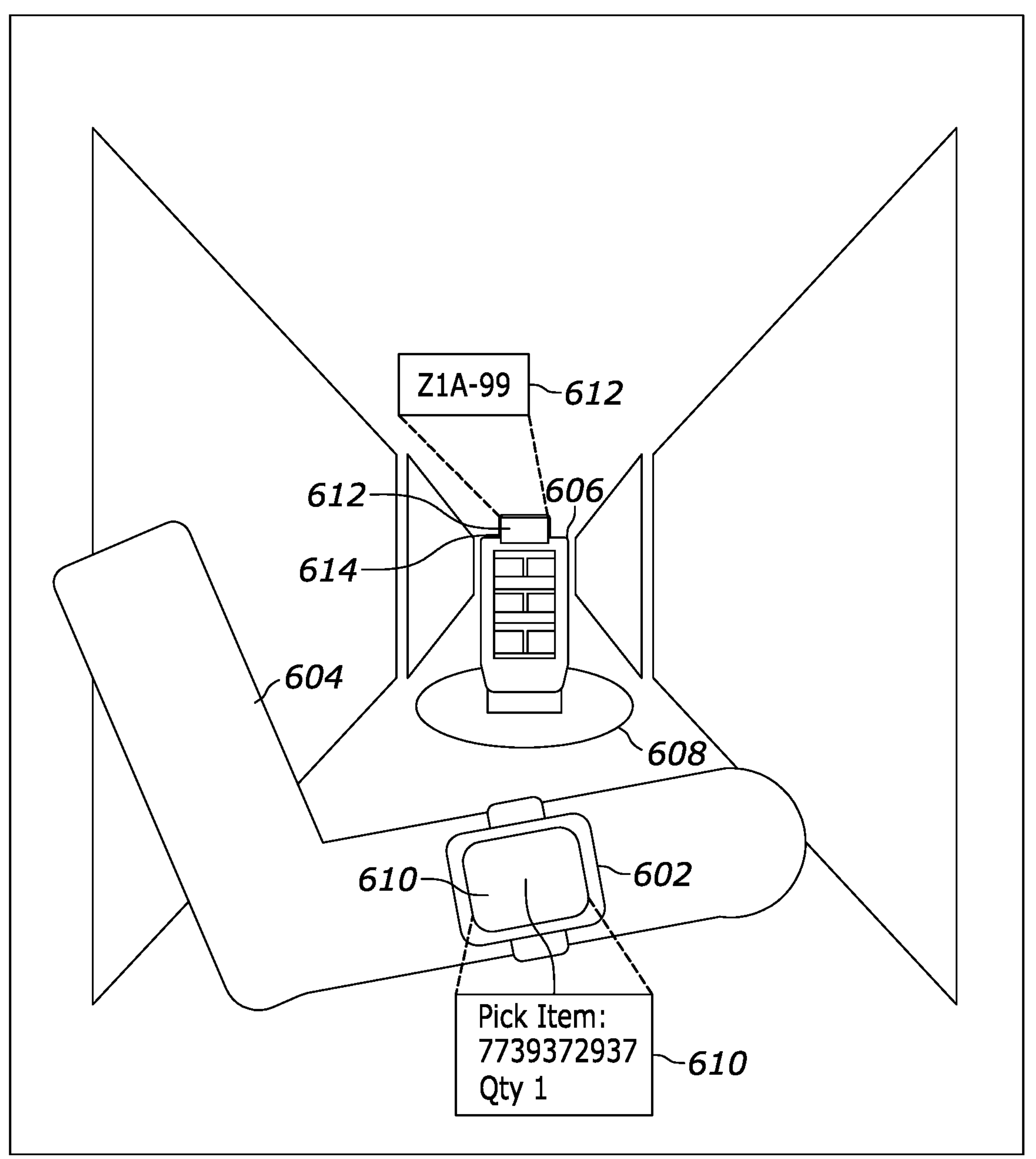
FIG. 6 depicts a front view of a primary used device and an assistive device not within proximal pairing distance of one another.
Figure 7:
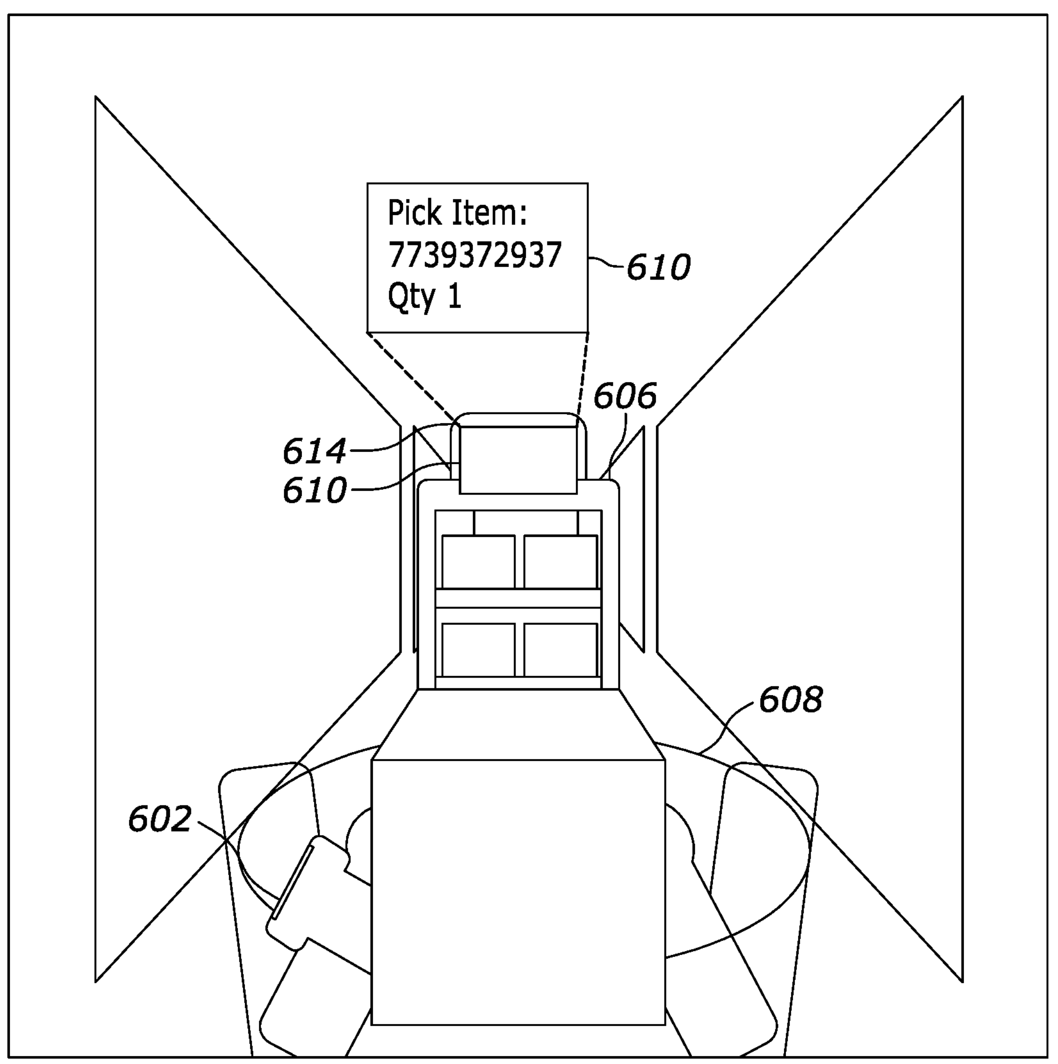
FIG. 7 depicts a front view of the primary used device and the assistive device of FIG. 6 within proximal pairing distance of one another and after UI management modification to a display of the assistive device, in accordance with embodiments described herein.

At blocks 512 and 514, respectively, the primary device and the assistive device modify their UI displays to reflect the predefined or dynamic changes requested at block 510. FIG. 6, for example, shows a primary user device 602 on a user's arm 604 as the user approaches an assistive device 606, but before the device 602 enters a presence detection area 608. First variable data 610 (e.g., instruction "Pick Item: 7739372937 Qty 1") is displayed on the device 602, while second variable data 612 (e.g., graphic/text "Z1A-99") is displayed on a display 614. In FIG. 7, however, and responsive to block 514 (with the primary user device 602 within the presence detection area 608), the first variable data 610 of FIG. 6 is displayed on the display 614 (e.g., instruction "Pick Item: 7739372937 Qty 1") of the assistive device 606, replacing the second variable data 612 of FIG. 6.

At a block 516, the method 500 may continually check for changes in the primary user device, the assistive user device, and or the state of task data (e.g., state of task completion), for example by receiving updated data. In response to detecting changes in data, control may be passed back to the block 510 for determining if further UI changes are required at either or both of the primary user device and the assistive device. For example, in ranging applications, the variable data displayed on the display 614 may change in magnification depending on how far or how close the primary user device 602 is to the assistive device 606. For example, ranging data may be determined from RF transceivers in the devices (for example, from BT data, BLE data, or LIDAR data) and communicated to the block 510 which applies a protocol that increases display font/graphic size when the device to device distance increases and decreases display font/graphic size when the that distance decreases. In some examples, the changes detected at block 516 may be from the user inputting data on the display of the primary user device 602 or from the user scanning a product using the primary user device 602. That is, in some examples, the primary user device 602 may include an imager capable of barcode scanning or an RFID scanner capable of identifying RFID tags or other RFID transmitters.

Figure 8:
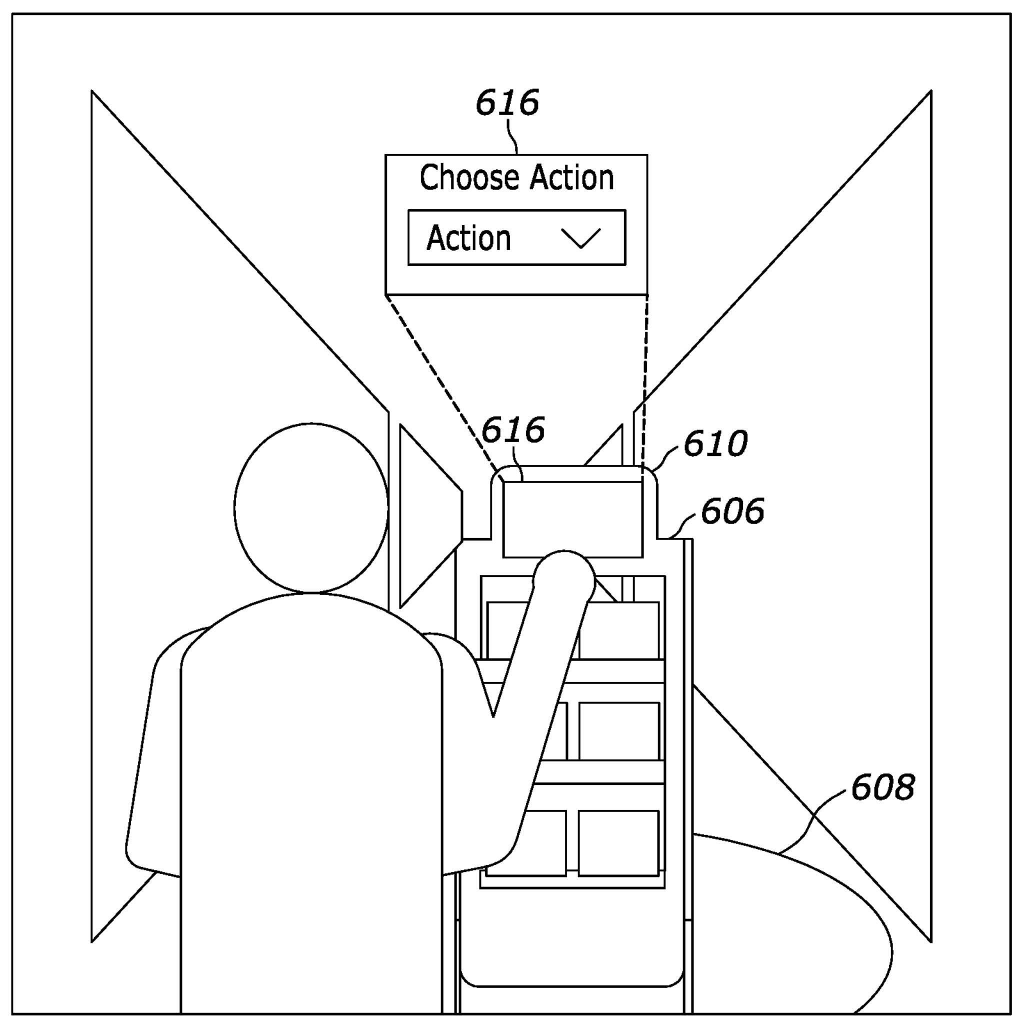
FIG. 8 depicts a front view of the assistive device of FIG. 6 showing a task exception handling UI display, in accordance with embodiments described herein.

While FIG. 7 illustrates an example of displaying on the assistive device 606, variable data obtained from the primary device 602, more generally such UI management may result in the display of variable data that is not a replication of primary device variable data but other data determined from a protocol. The determination (at block 510) of what is displayed is based on a UI management protocol. The method 500 illustrates an example in the form of task exception handling. In particular, at a block 518, the method 500 detects whether task exception handling should be performed. The determination may be based on updates to one or more data in the data 508, such as for example, the primary device task data. During task performance, a user may indicate on their primary user device an inability to complete a task, or the primary user device may indicate a failed scan attempt of a product or an incorrect barcode scanned on a product. Such data is communicated from the primary user device to a processing platform that determines if a task exception handling event has occurred, e.g., an event requiring a change to predefined task instructions. If task exception handling is to be performed, then a block 520 may generate a task exception handling UI variable data and send an instruction to the assistive device to display that task exception handling UI variable data. That variable data may be further instructions to a user for taking alternative actions on the current task or instructions initiating an alternative task. As illustrated in FIG. 8, via block 518, task excepting handling UI variable data 616 (e.g., user selectable instruction "Choose Action: Action (dropdown menu)") may be displayed on the display 610, in the form of an interactive menu that allows a user to select an exception handling action. In other examples, the block 520 may transmit instructions to the primary user device 602 to display task exception handling UI variable data.

In the illustrated example, the process 500 ends with a block 524, where the user completes a task or clears a task and that data is transmitted to a controller, such as the processing platform, where the tasks for a user end or where the user is assigned a next task in a queue.

Figures 9, 10, 11:
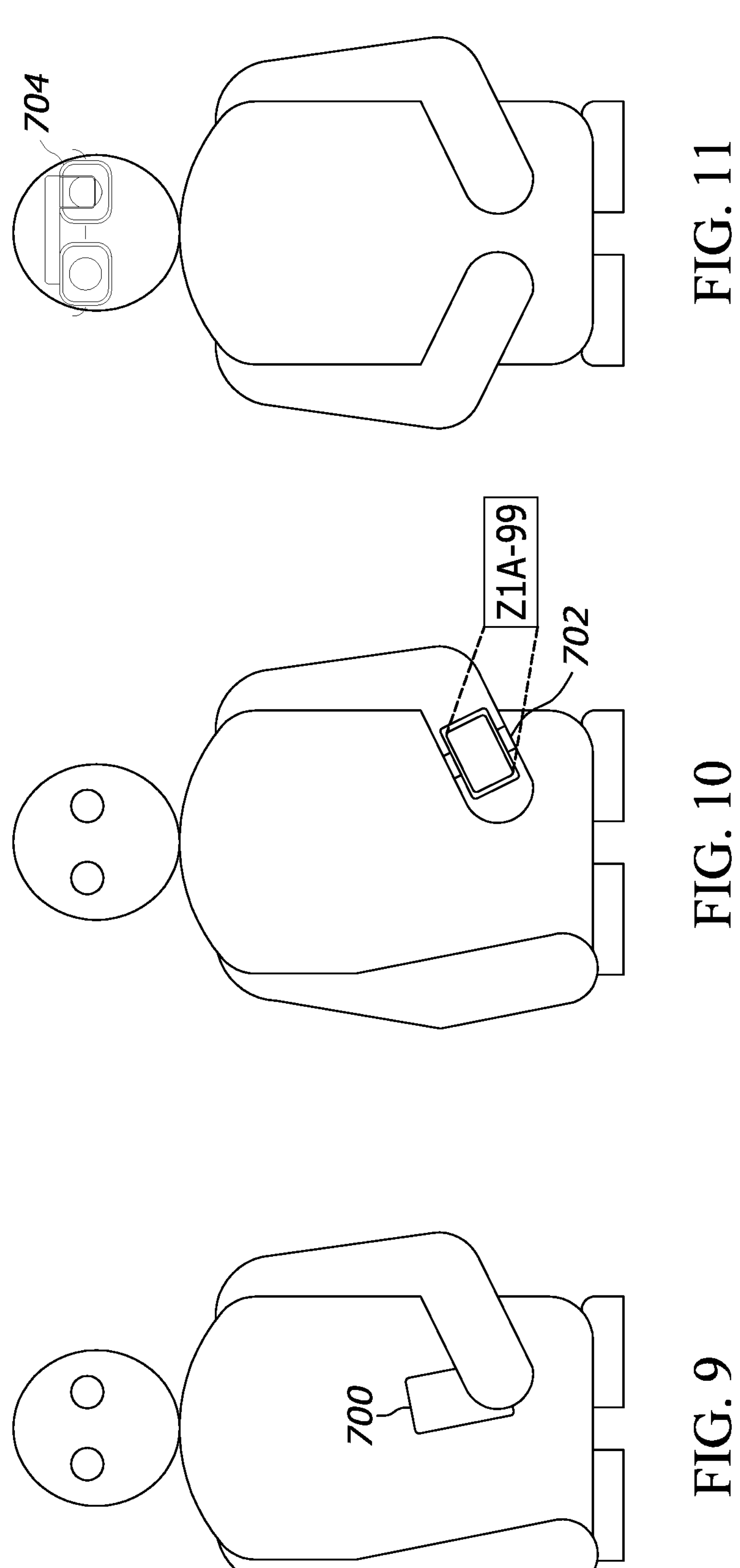
FIG. 9 illustrates a primary used device in the form of a mobile device, in accordance with embodiments described herein.
FIG. 10 illustrates a primary used device in the form of a wearable wrist-mounted device, in accordance with embodiments described herein.
FIG. 11 illustrates a primary used device in the form of a wearable heads-up display device, in accordance with embodiments described herein.

In various examples, the second (assistive) devices herein may be movable devices such as an autonomous mobile robot (AMR), a mobile robot, or a drone. As shown in FIGS. 10-12, the first (primary) user devices may be a handheld mobile device 700, a wearable device 702, or a heads up display device 704. Any of the displays herein, whether the assistive devices or primary devices or other, may be interactive touchscreen displays. Further, the displays may be accompanied by a keyboard (e.g., full QWERTY keyboard) or keypad to allow user interaction. Yet further still, any of the devices herein may include other interaction modalities or combinations thereof, such as voice-based interactions (through speakers, headphones, etc. as part of the devices) or haptic feedback interactions (through haptic interfaces of the devices). Indeed, any of the devices herein may be replaced with (or augmented to include) a voice-interaction device, a haptic device, or keypad button interface.

While various examples are described in reference to UI management between devices through affecting device displays, the techniques and methods herein may be implemented through affecting other modalities of user interaction, such as voice interactions, haptic interactions, or others, or through combinations of interaction modalities. For example, at the blocks 512, 514, or 522 of the process 500, in place of (or in addition to) modifying UI displays to reflect the predefined or dynamic changes, the processes may be implemented to utilize other modalities of interaction such as voice or enhanced voice commands to the user. For example, UI variable data from the primary user device 602 (e.g., a wearable or handheld device) may result in the block 514 causing the assistive device 606 to generate voice or other audio-based instructions to the user, using a speaker (not shown) on the assistive device 606. In examples, the block 512 may cause the primary user device 602 to generate voice or other audio-based instructions to the user. In yet other examples, if the primary user device 602 or the assistive device 606 are configured as haptic devices, then the respective blocks 512, 514 may generate instructions to provide haptic feedback to the user providing instructions responsive to the analyzed UI variable data or other received data.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for proximity device to device user interface management, the system comprising:

a first device having at least one processor, a transceiver, and a display, the first device being configured to display first variable data on the display to a user of the first device, where the first variable data are modifiable in response to task data for one or more tasks performed by the user of the first device;

a second device having at least one processor, a transceiver, and a display, the second device being configured to display second variable data on the display to the user of the first device;

a controller; and a memory storing computer-readable instructions that, when executed by the controller, cause the controller to, pair the first device with the second device when the first device and the second device are within a predetermined range of each other, identify a state of task data of the first device, and instruct the second device to modify, in response to the identified state of the task data, the second variable data displayed on the second device display for viewing by the user of the first device, wherein the controller is further configured to instruct the first device to modify the first variable data displayed on the first device display in response to state data of the second device, the state data of the second device comprising at least one of task completion state data and task exception state data, instruct the second device to modify the second variable data displayed on the second device display in response to a change in a distance between the first device and the second device, when the first device and the second device are within the predetermined range of each other, and instruct the second device to modify the second variable data displayed on the second device display by at least one of:

increasing or decreasing a size of the second variable data displayed on the second device display in response to the change in the distance between the first device and the second device, and changing the second variable data displayed on the second device display in response to the change in the distance between the first device and the second device.

2. The system of claim 1, wherein the controller is further configured to instruct the second device to modify the second variable data displayed on the second device display to include the first variable data displayed on the first device display.

3. The system of claim 1, wherein the second variable data comprises at least one of task instructions for the user of the first device obtained from the first device, proximity information, duplicate information from the first variable data, task completion information, a request for user input to the second device display, and alternative task instructions.

4. The system of claim 1, wherein the controller is further configured to instruct the second device to modify, in response to the second device state data, the first variable data displayed on the first device display to display at least one of task instructions for the user of the first device, proximity information, duplicate information from the second variable data, task completion information, a request for user input to the first device display, and alternative task instructions.

5. The system of claim 1, further comprising a proximity detection subsystem configured to detect when the first device and the second device are within the predetermined range of each other.

6. The system of claim 5, wherein the proximity detection subsystem comprises at least one of the transceiver of the first device and the transceiver of the second device and is configured to receive position data from the first device and/or the second device and determine when the first device and the second device are within the predetermined range of each other.

7. The system of claim 6, wherein the transceiver of the first device and the transceiver of the second device are each a Bluetooth Low Energy (BLE) radio transceiver or a Bluetooth radio transceiver.

8. The system of claim 5, wherein the proximity detection subsystem is a ranging system configured to determine a change in distance between the first device and the second device when the first device and the second device are within the predetermined range of each other.

9. The system of claim 5, wherein the proximity detection subsystem is a locationing system communicatively coupled to the first device and the second device.

10. The system of claim 5, wherein the controller is further configured to unpair the first device and the second device in response to at least one of an indication from the proximity detection subsystem that the first device and the second device are outside of the predetermined range of each other, and receiving task completion information from the first device or the second device.

11. The system of claim 1, wherein the first device is a mobile device, a wearable device, or a heads up display device, and the second device is one of an autonomous mobile robot (AMR), a mobile robot, and a drone.

12. A method for proximity device to device user interface management, the method comprising:

determining when a first device and a second device are in a predetermined range of each other, the first device being configured to display first variable data to a user of the first device, where the first variable data are modifiable in response to task data for one or more tasks performed by the user of the first device and the second device being configured to display second variable data;

pairing the first device with the second device when the first device and the second device are within the predetermined range of each other;

identifying a state of task data of the first device; and instructing the second device to modify, in response to the identified state of the task data, the second variable data displayed on the second device display for viewing by the user of the first device; and instructing the second device to modify the second variable data displayed on the second device display by at least one of increasing or decreasing a size of the second variable data displayed on the second device display or changing the second variable data displayed on the second device display in response to a change in a distance between the first device and the second device, when the first device and the second device are within the predetermined range of each other.

13. The method of claim 12, further comprising instructing the second device to modify the second variable data displayed on the second device display to include the first variable data displayed on the first device display.

14. The method of claim 12, wherein the second variable data comprises at least one of task instructions for the user of the first device obtained from the first device, proximity information, duplicate information from the first variable data, task completion information, a request for user input to the second device display, and alternative task instructions.

15. The method of claim 12, further comprising detecting when the first device and the second device are within the predetermined range of each other using a proximity detection subsystem.

16. The method of claim 15, wherein the proximity detection subsystem comprises at least one of the transceiver of the first device and the transceiver of the second device and is configured to receive position data from the first device and/or the second device and determine when the first device and the second device are within the predetermined range of each other.

17. The method of claim 16, wherein the transceiver of the first device and the transceiver of the second device are each a Bluetooth Low Energy (BLE) radio transceiver or a Bluetooth radio transceiver.

18. The method of claim 12, further comprising unpairing the first device and the second device in response to at least one of:

an indication from the proximity detection subsystem that the first device and the second device are outside of the predetermined range of each other, and receiving task completion information from the first device or the second device.

19. The method of claim 12, wherein the first device is a mobile device, a wearable device, or a heads up display device, and the second device is one of an autonomous mobile robot (AMR), a mobile robot, and a drone.

20. The method of claim 12, further comprising instructing the first device to modify the first variable data displayed on the first device display in response to state data of the second device.

21. The method of claim 20, wherein the state data of the second device comprises at least one of task completion state data and task exception state data.

* * * * *